United States Patent [19]
Norbäck

[11] 3,983,190
[45] Sept. 28, 1976

[54] LIQUID-GAS CONTACT APPARATUS AND METHOD FOR MAKING THE SAME

[75] Inventor: Per Gunnar Norbäck, Lidingo, Sweden

[73] Assignee: Aktiebolaget Carl Munters, Sollentuna, Sweden

[22] Filed: Apr. 24, 1974

[21] Appl. No.: 463,828

[30] Foreign Application Priority Data
Feb. 22, 1974 Sweden.............................. 7402409

[52] U.S. Cl.............................. 261/111; 261/112; 261/DIG. 11; 156/250
[51] Int. Cl.².................... B01F 3/04; B32B 31/18
[58] Field of Search............ 261/111, 112, DIG. 11, 261/98, 103; 161/136, 137; 156/250

[56] References Cited
UNITED STATES PATENTS

| | | | |
|---|---|---|---|
| 1,516,187 | 11/1924 | Hanson | 261/103 X |
| 2,054,809 | 9/1936 | Fleisher | 261/112 |
| 2,631,022 | 3/1953 | Baird et al. | 261/DIG. 11 |
| 2,793,017 | 5/1957 | Lake | 261/112 |
| 2,986,379 | 5/1961 | Kramig, Jr. | 261/112 X |
| 3,500,615 | 3/1970 | Meek | 261/112 X |
| 3,574,032 | 4/1971 | Norback et al. | 161/137 X |
| 3,792,841 | 2/1974 | Munters | 261/DIG. 11 |
| 3,917,764 | 11/1975 | Phelps | 261/111 |

FOREIGN PATENTS OR APPLICATIONS

| | | | |
|---|---|---|---|
| 550,268 | 3/1923 | France | 261/DIG. 11 |

Primary Examiner—Tim R. Miles
Assistant Examiner—Richard L. Chiesa
Attorney, Agent, or Firm—John A. Mitchell; Pasquale A. Razzano

[57] ABSTRACT

A contact apparatus for effecting the interaction of air and water including at least one bed mounted in a casing of units positioned side by side with each unit composed entirely or partly of corrugated, vertically positioned layers or sheets for receiving water supplied from the top of the casing and air flowing upwardly from the bottom of the casing. The bed has a downward slope from the air intake side of the casing towards the interior of the apparatus.

9 Claims, 6 Drawing Figures

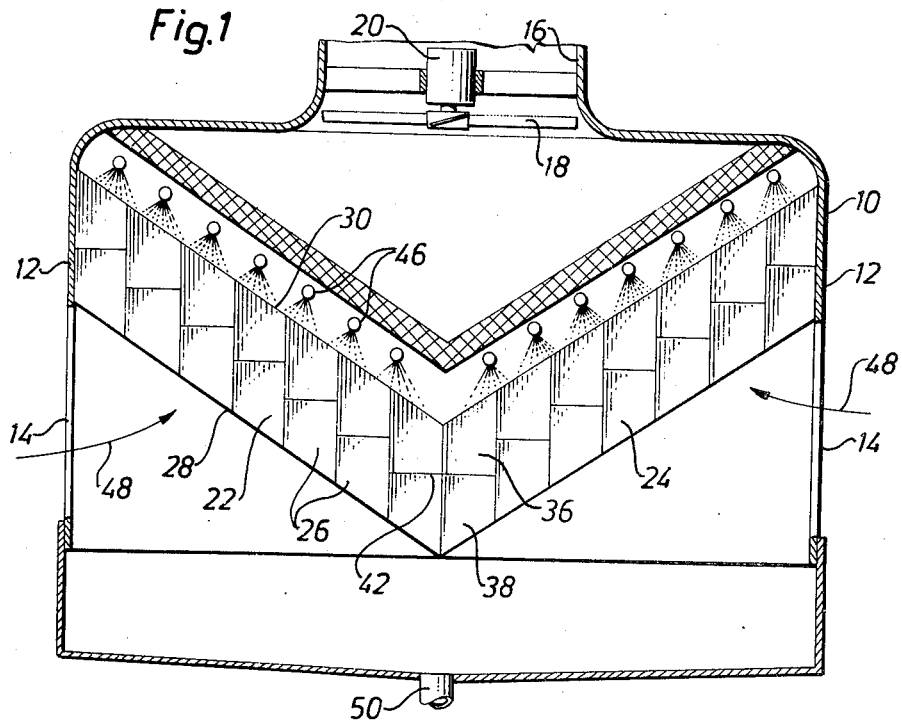
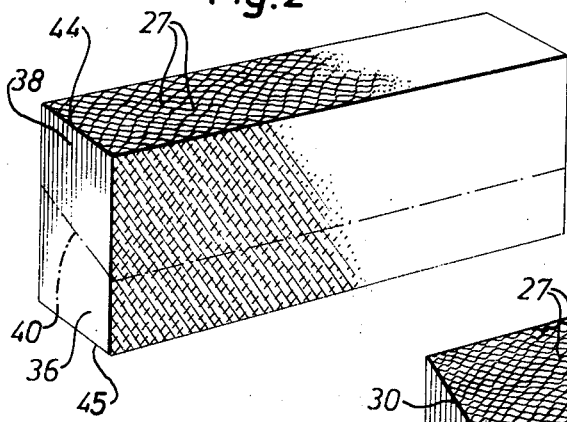
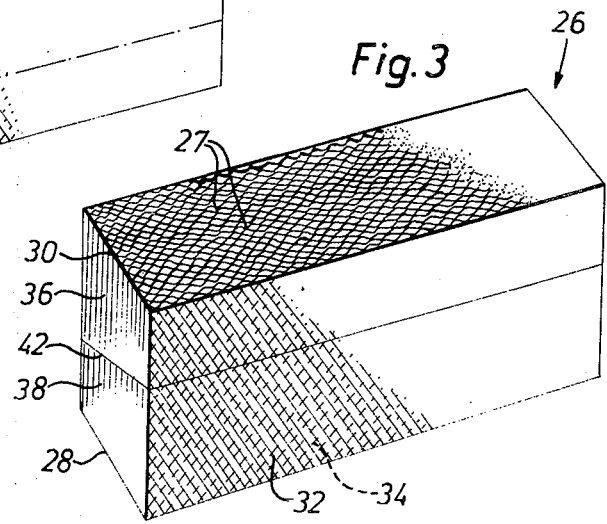

LIQUID-GAS CONTACT APPARATUS AND METHOD FOR MAKING THE SAME

This invention relates to a contact apparatus intended for interaction of air and water and includes at least one contact bed mounted in a casing and formed of contact units disposed side by side with each unit composed of entirely or partly of corrugated, vertically positioned layers or sheets to which are supplied water from above and air streaming upwards from below. The bed has a downward slope from the air intake side of the casing towards the interior of the apparatus.

Fields of utilization of the invention are cooling towers for the cooling of water, humidifiers for increasing the moisture content of air, apparatus for removal of impurities from water or air etc. The bed of units or contact bodies may be composed of two portions which slope towards one another from the two opposed lateral walls of the casing through which the air is fed.

One main object of the invention is to provide a contact apparatus having an inclined contact bed or beds to which are passed two fluids, air and water, in practically straight countercurrent flow, as a result of which the efficiency, as far as the exchange between said fluids is concerned, attains an optimum value.

Another object of the invention is to provide within a given volume of a casing a maximum capacity with respect to the intended interaction between the two fluids.

The invention is substantially characterized by the contact units which have two opposed vertical sides, with the layers or sheets of the units, in at least one portion thereof located substantially parallel to the air intake side of the casing. The contact units are successively displaced relative to one another in a downward direction towards the interior of the casing in such a manner that the upper and lower sides or end surfaces of the units form an inclined angle to the horizontal plane so as to correspond with and define upper and lower sloping surfaces of the contact bed. Preferably, the units are elongated in shape and their vertical longitudinal sides as well as sheet layers forming the unit are parallel to the air intake side of the casing.

According to a further important characterizing feature of the invention the units in vertical cross-section have the contour of a rhomboid, with the layers and the passageways or channels formed therebetween extending vertically while the top and bottom sides of the units form a coherent, sloping surface. According to the invention the air in spite of the feature that it is fed at an oblique angle to the sloping lower side of the contact bed, upon deflection will pass in a vertical direction upwards through the passageways between the layers or sheets as a consequence of the shape thereof. The air meets the water also streaming vertically, though downwards, and the interaction between the two fluids will thus take place under practically parallel flow in countercurrent relation with a maximum efficiency of transfer as a desired result. This has as a consequence that the units can be composed of layers which all are corrugated with the corrugations in adjacent layers or sheets crossing one another so that the interspaces between the layers extend from end to end both vertically and horizontally. In spite thereof, both the air and the water thus are given vertical direction of flow through the passageway.

According to a particularly suitable embodiment the individual contact units comprise two superimposed elements, with the top side of the upper unit and the bottom side of the lower unit sloping in the same direction between their two vertical sides which extend parallel to the air intake side of the casing, while the side surfaces of the superimposed elements which face one another extend horizontally or almost horizontally.

A method especially suitable for the manufacture of this last-mentioned embodiment is characterized in that in a first step a pack or workpiece is formed of interconnected, entirely or partially corrugated, mutually parallel layers or sheets having a shape which in section perpendicular to the surface of the layers or sheets is rectangularly four-edged, and in a second step said workpiece is cut into two elements along a section plane forming an oblique angle to those sides of the workpiece which coincide with (or are parallel to) the side surfaces of the layers. In this way the extraordinary advantage is gained that the units can be shipped to the site of installation as rectangular packs due to the fact that the surfaces cut at inclined angle face one another. In the subsequent installation it is necessary only that the two elements exchange their positions so that the obliquely cut side surfaces are located uppermost and lowermost in the unit. This results also in a particularly good drainage of water at the bottom edge of the bed due to the feature that the layers in each unit are angle-cut in the same oblique plane. This additionally assists in counteracting any overbridging of the passages between the sheets by water and therewith clogging of the passageways at the lower edges of the contact bed by the combined effects of surface tension of the water and upwards directed suction effect of the air.

The invention shall hereinafter be described in more detail with reference to several embodiments shown in the accompanying drawings.

FIG. 1 is a vertical sectional view of a cooling tower containing contact units embodying the main features of the invention.

FIGS. 2 and 3 are perspective views of a contact unit composed of two elements shown in two different relative positions.

Figure 4:
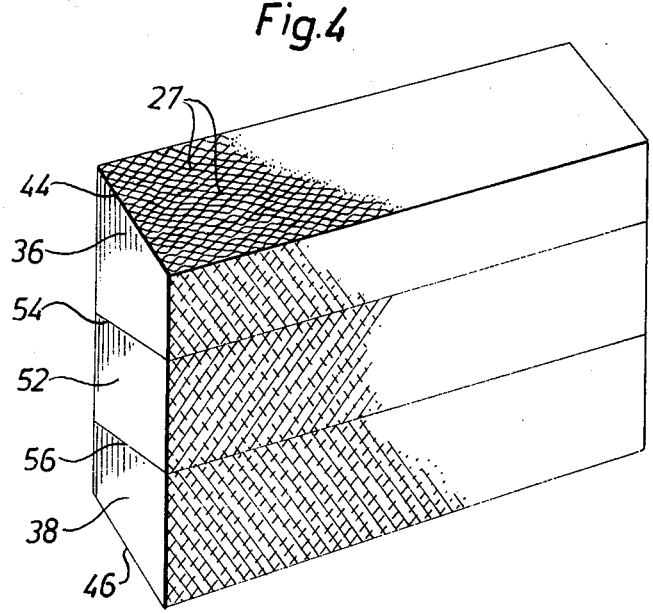
FIGS. 4 and 5 are perspective views of contact units representing two further embodiments.

Referring now to the drawings, reference numeral 10 denotes a substantially rectangular casing or tower which has two opposed parallel sides 12 having air intake openings 14.

At the top side of casing 10 at least one air discharge opening 16 formed within which is mounted an impeller member 18, that is driven by a motor 20 so as to draw out the air from the interior of the tower. The interior of the tower is in the embodiment according to FIG. 1 occupied by a contact bed formed of a plurality of contact units or bodies 26, with the bed being subdivided into two portions 22, 24 each sloping downwards from an associated side wall 12 towards one another and meeting in the interior of the tower. Each of the two portions 22, 24 extends from a place located above its associated air opening 14 downwards and inwards to a level which may approximately coincide with the lower edge of the openings. The contact bodies or units are composed of layers or sheets 27 which extend in parallel relationship to the air intake sides 12 and which thus perpendicularly to the plane of the drawing in FIG. 1. Furthermore, these layers or sheets are arranged relative to one another in such a manner that between them passageways extending from end to end are formed in a generally vertical direction. The layers 27 are interconnected to from the individual units 26 which contact units successively are displaced in a vertical direction relative to one another from the intake opening 14 in a direction towards the interior of the tower in such a manner that the top and bottom end surfaces 28, 30 of the contact bed formed by the assembled units have a slope to the horizontal plane with the top and bottom surfaces of the units preferably forming flush continuations of one another so that the two bed portions 22, 24 present coherent plane lower and upper end surfaces 28, 30 along their entire length. Preferably, each unit or contact body 26 constitutes an elongated pack having two vertical longitudinal sides which coincide or are formed by the layers 27 and which are placed side by side with the layers extending perpendicularly to the drawing plane of FIG. 1.

The layers or sheets 27 in the individual units or contact bodies may to advantage be corrugated with the corrugations crossing one another in adjacent layers as is indicated at 32, 34 in FIG. 3, and the corrugations in both groups of layers having an inclination to the vertical at an inclination angle which may amount to 20°–40°. The layers bear or engage against one another and are interconnected at the places of contact by means of a binding agent. These places of contact occur, as seen in FIG. 2, where the crests of the corrugations cross. In this way interspaces or passageways are obtained between the layers 27 which passageways extend over the entire unit both vertically and horizontally and which have a width varying all the time between zero, at the places of contact, to double the height of the corrugations.

The layers or sheets 27 may consist of paper of cellulose or asbestos or some other inorganic fibrous material or of plastic material. The thickness of the layers may amount to one or several tenths of one millimeter. When they are made of fibrous material which in itself has not sufficient wet strength they are impregnated in a known manner so that they may be imparted wet strength to a satisfying degree. If they are to be utilized for moistening of air they must possess water absorbing property also. The medium spacing between the layers may be 8–30 mms in cooling towers, 3–10 mms in humidifiers and up to 50 mms in apparatus for purification, especially biological purification of water.

The contact body or unit 26 may be composed of — instead of layers with mutually crossing corrugations — alternately plane and corrugated layers or sheets folded to honey cake pattern. In this last-mentioned case tubular passageways are formed which extend vertically in the finally installed bed of contact bodies. In these cases also, the abovementioned medium spacings are well suited.

The individual units or contact bodies 26 positioned side by side and are preferably composed of at least two superimposed elements. In the embodiment according to FIGS. 1–3 two units 26 are cut from a single body to form two elements or units 36, 38. This embodiment has the advantage that the units or elements 36, 38 during shipping or storage can be given a shape which renders them easier to handle them and to stack one above the other. To this purpose a single coherent pack or body according to FIG. 2 is formed initially with all its lateral edges extending at right angles. The pack or workpiece obtained in this manner is now cut along a plane 40 into suitably equal parts, said plane forming an oblique angle to the upper and lower sides (44, 45) of the pack. The inclination or slope of the plane 40 is the same as the angle of slope in the complete bed of contact bodies in the two parts 22, 24 thereof. In this shape the two-parted units can be piled one upon the other in an easy manner. At the place of installation the positions of the two parts 36 and 38 are reversed so that the previously upper part or element 38 will be positioned below the previously lower part or element 36 with the flat surfaces 44, 45 in engagement. In this way a contact body is now obtained which in cross-section has the shape of a rhomboid according to FIG. 1. The common contact surfaces 42 in FIGS. 1 and 3 which in FIG. 2 have their counter part in the upper end surface 44 and the lower end surface 45 in the pack workpiece will thus be given a horizontal position when the elements are built into tower 10. By the severing of an initially manufactured workpiece into two elements along the inclined plane of cut 40 the bottom edge 28 of the lower element 38 when installed will extend in a plane which is common or approximately common for the bottom edges or lower end surfaces of all units. As a result the draining off of the water along the underside of the sloping bed towards the lowermost portion thereof is assisted so that the water streaming down through the passageways between the layers does not clog the lower edges thereof by overbridging which otherwise easily could be brought about by the combined effects of the surface tension and the air penetrating upwards from below and thus tending to retain the water. Otherwise, such a formation of clogs would increase the resistance to the upward flow of the air and/or exert a hampering effect on the intended interaction of the fluids meeting one another inside the cooling tower, i.e. it would hamper the cooling of the water fed thereinto.

In operation of the tower water is supplied from above onto the bed of contact bodies by spreaders 46 and thereupon follows along the layers or sheets in the bed. In this movement the water meets air which as indicated by the arrows 48 is taken in through the side openings 14 and at an inclined angle streams towards the lower edges of the contact bodies. Due to the position of the layers relative to one another inside the bed units the air is imparted in a substantially vertical upward direction of flow so that the cooling of the water is effected in a practical ideal countercurrent flow with high efficiency as a result thereof.

The cooled water which is intended to be employed e.g. in an air conditioning system is discharged through the outlet indicated at 50 to be returned thereupon through the spreaders 46 to the contact bodies for repeated cooling action. The cooling effect is obtained in the cooling tower in known manner by heat becoming latent when a minor part of the water is evaporated into the air.

FIG. 4 illustrates an embodiment wherein interposed between the upper and the lower elements of the unit is an element 52 which has the same general shape of the individual layers or sheets as the parts 36, 38, but presents a contour with rectangular corners overall. This feature implies that the contact or engaging surfaces 54, 56 facing the upper and lower elements in the finally installed position extend horizontally. The top and bottom end surfaces 44, 46 of the composed unit or contact body have a slope relative the horizontal plane as in the previously described embodiment. In this way the bed can be given any desired vertical depth by means of unit elements manufactured according to a predetermined standard.

Figure 5:
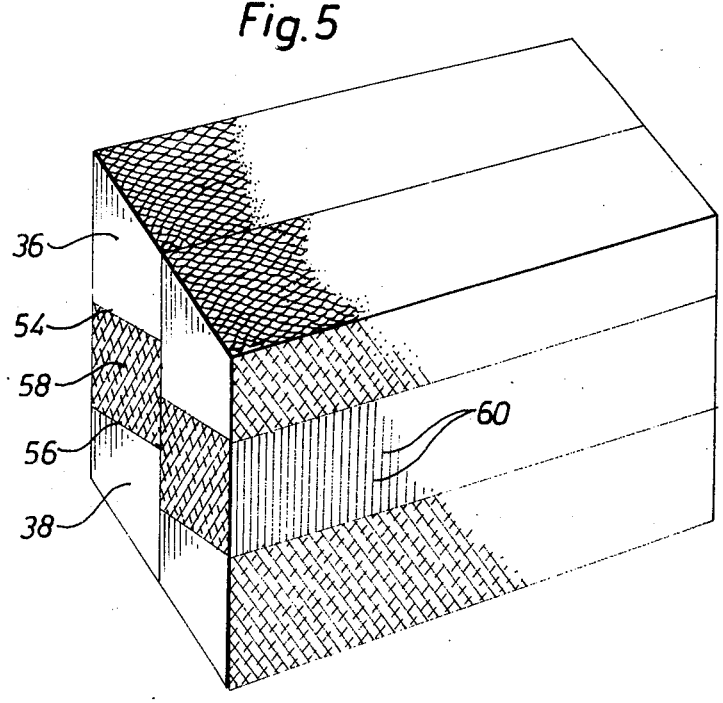

Also in the embodiment illustrated in FIG. 5 an additional element 58 has been placed between the two elements 36, 38 but in this case the layers or sheets 60 extend perpendicularly to the layers or sheets 27. As a result the layers and their passages cross each other in the horizontal planes of contact 54, 56, and a good distribution of water over the surfaces of the layers or sheets is obtained during the downward flow through the contact bodies. The pack 58 with its transversely extending layers or sheets is not mounted on the lower units 38 since the carrying capacity of the latter is too low: instead the units are supported at some few places by crossbars (not shown). Furthermore, their proportion in the vertical direction of the contact body should be limited especially in the case when the passageways between the layers 60 are formed by crosswise corrugations in order to limit the flow in lateral direction of the water from one unit to an adjacent unit etc.

Figure 6:
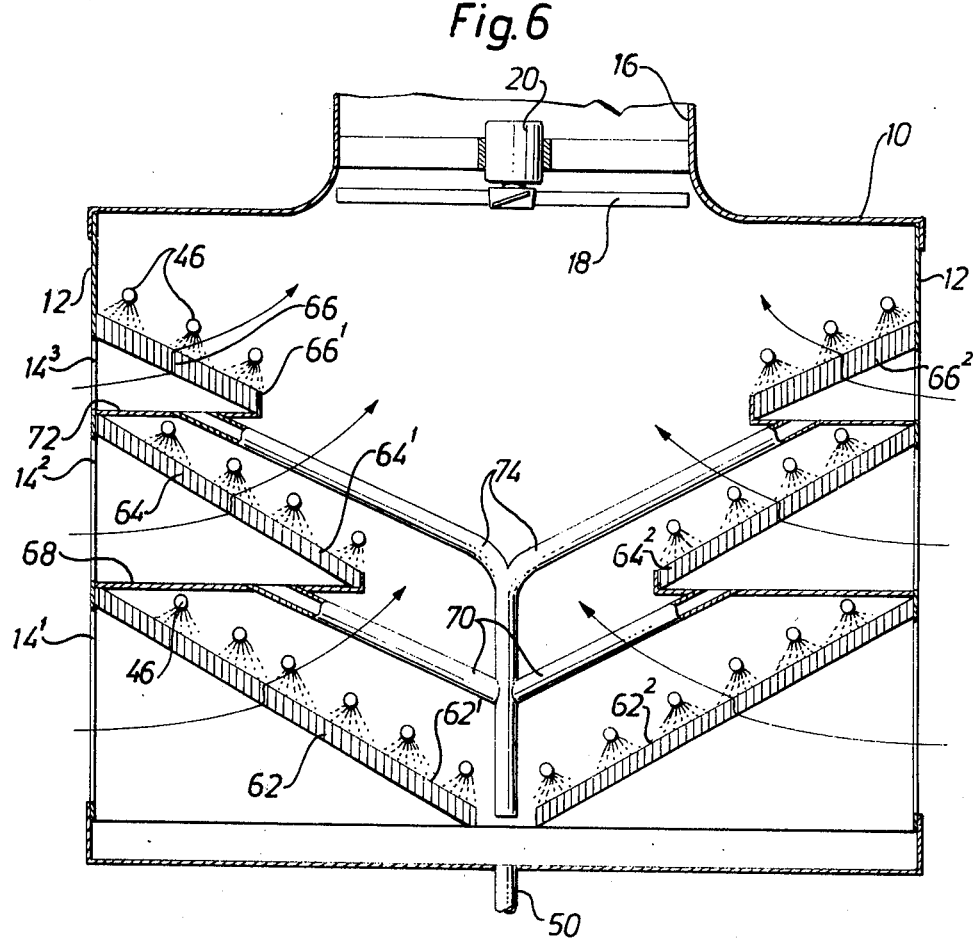
FIG. 6 is a vertical sectional view of another cooling tower having a plurality of superimposed beds of contact units or bodies formed and positioned in accordance with the present invention.

In the embodiment shown in FIG. 6 a plurality of beds of insert bodies or units are mounted in spaced superimposed relation. This embodiment is particularly suited for large or very tall cooling towers. Therefore, they are especially suited for reconstruction of old cooling towers the insert contact bodies of which are to be replaced. By such reconstruction cooling towers of older types can be given substantially increased capacity.

Each contact bed can to advantage have two parts sloping towards one another as in the preceding embodiment with said parts, however, ending at some spacing from one another, especially in the uppermost beds, in order to permit the air to be conducted between the beds. In the illustrated embodiment the cooling tower has three beds 62, 64, 66, of which the lowermost one denoted 62 has the greatest breadth so that its two portions $62^1$, $62^2$ reach almost down to the centre of the tower and if desired even may bear against one another. The next following bed 64 has smaller breadth so that a sufficient aperture exists between its portions $64^1$ and $64^2$ for the air escaping from the lowermost bed 62. This air is introduced through the two openings $14^1$ and passes through the layer units $62^1$, $62^2$ in this bed in countercurrent flow to the water supplied from above through spreaders 46.

The third bed 66 has a still smaller breadth so that a greater interspace is formed between the portions $66^1$ and $66^2$ thereof. This interspace thus accommodates the air streams which have passed through both lower beds 62 and 64. The cooled water after having passed the bed 64 is collected by a trough 68 and discharged by ducts 70 to the lower part of the casing. The air to be fed to the bed 64 is taken in through the openings $14^2$ located in the side walls 12 between the two lowermost beds. The uppermost bed 66 is supplied with air through openings $14^3$ in the side walls 12 and the cooled water after having passed through said bed is collected by troughs 72 and discharged through ducts 74 to the bottom of the casing. The contact or insert bodies in the various beds or layers are thus operated in parallel and not in series for the cooling of the water. In proportion to the reduction of the breadth (or width) of the layers the required air quantity is reduced for which reason the vertical spacing between the beds is reduced in an upward direction. Due to the arrangement thus described of the various beds and the portions thereof, the velocity of the air at the intake openings $14^1$, $14^2$, $14^3$ can be maintained at least approximately uniform. The same effect is obtained also for the velocity of the air which leaves the beds in a direction towards the interior of the tower.

Obviously, the invention is not limited to the illustrated embodiments, but may be varied in the widest sense within the scope of the invention, which is to be determined solely by the appended claims.

I claim:

1. A liquid-gas contact apparatus comprising a hollow casing including a generally vertically extending sidewall and an air inlet opening formed therein; a contact bed mounted in said casing and having upper and lower spaced and generally parallely extending surfaces inclined from positions above the air inlet opening in a downward angular direction toward the interior of the casing; said contact bed composed of a plurality of liquid-gas contact units located in predetermined positions with respect to each other to form said bed; each of said units being formed from a plurality of interconnected layers of sheet material, at least some of which are formed of corrugated sheet material to define a plurality of liquid gas passageways between adjacent layers; said units being positioned in said casing with said layers of sheet material and the passageways between adjacent layers lying in vertical planes extending parallel to the plane of said inlet opening and vertical sidewall; said units each having upper and lower spaced parallely extending surfaces inclined in a downward angular direction from the casing sidewall toward the interior of the casing across said sheets, and being displaced downwardly relative to one another towards the interior of the casing with their upper and lower surfaces substantially in alignment to provide the upper and lower surfaces of said contact bed; and said contact units having a generally rhomboid peripheral configuration when viewed in section transversely of the layers thereof with said rectangular sides forming a pair of vertical parallel sides of the rhomboid.

2. The apparatus as defined in claim 1 wherein said units are generally elongated and have a pair of vertically extending generally rectangular sides respectively formed by layers of sheet material, said units being positioned with said elongated sides in vertical planes extending parallel to the vertical sidewall and air inlet of the casing.

3. The apparatus as defined in claim 2 wherein each of said units comprises an upper and lower pair of superimposed contact unit elements, said upper contact unit elements each having an inclined upper surface defining the upper inclined surface of the unit and a lower generally horizontally extending surface, and said lower contact unit element having an upper generally horizontally extending surface facing the lower surface of the upper unit element and a lower inclined surface extending in parallel spaced relation to the upper surface of the upper unit element and defining the lower inclined surface of the unit.

4. The apparatus as defined in claim 3 wherein each of said contact units includes at least one additional unit element having generally horizontally extending upper and lower surfaces positioned between the facing horizontally extending surfaces of said upper and lower superimposed unit elements; said at least one unit element being formed from a plurality of interconnected layers of sheet material at least some of which are corrugated to define a plurality of liquid gas passageways between adjacent layers.

5. The contact apparatus as defined in claim 4 wherein the layers of sheet material in said at least one additional unit element extend vertically and parallel to the layers of sheet material in said upper and lower unit elements whereby the passageways between the layers thereof lie in planes extending parallel to said casing's vertical sidewall and air inlet openings.

6. The contact apparatus as defined in claim 4 wherein the layers of sheet material in said at least one additional unit element extend vertically and transversely to the layers of sheet material in said upper and lower unit elements whereby the passageways between the layers thereof lie in planes extending transversely to said casing's vertical sidewall and air inlet opening.

7. The apparatus as defined in claim 1 wherein said casing contains a plurality of vertically spaced contact beds located at different levels therein; said beds, from the vertical sidewall of the casing having said inlet opening therein, having varying extensions in the direction toward the interior of the casing with the lowermost bed having the maximum extension and the uppermost bed having the minimum extension.

8. The apparatus as defined in claim 7 wherein the vertical spacing between said beds is reduced in an upward direction.

9. A method for manufacturing gas-liquid contact units consisting of upper and lower superimposed contact unit elements wherein the upper contact unit element has an inclined upper surface and a lower generally horizontal surface and the lower contact unit element has an upper generally horizontally extending surface facing the lower surface of the upper element and a lower inclined surface extending in parallel spaced relation to the upper inclined surface of the upper unit element, said method comprising the steps of first forming a pack workpiece by interconnecting a plurality of parallely extending generally rectangular layers of sheet material at least some of which layers have corrugations formed therein thereby to define passageways between the layers lying in vertical planes that are parallel to the layers of sheet material; thereafter cutting said workpiece into two contact unit elements along a section plane forming an oblique angle to the rectangular surface of the layers of sheet material whereby the cut unit elements can be shipped without changing their position in a rectangular container; and thence exchanging the positions of the unit elements, to assemble the units, with the obliquely cut surfaces positioned in spaced parallel relation to form said upper and lower inclined surfaces.

* * * * *